United States Patent
McMahon

(10) Patent No.: US 6,676,839 B1
(45) Date of Patent: Jan. 13, 2004

(54) PROCESS FOR CONTINUOUS CHEMICAL SEPARATION

(76) Inventor: James P. McMahon, 615 Belknap, San Antonio, TX (US) 78212

( * ) Notice: Subject to any disclaimer, the term of this patent is extended or adjusted under 35 U.S.C. 154(b) by 190 days.

(21) Appl. No.: 09/731,885

(22) Filed: Dec. 7, 2000

Related U.S. Application Data

(60) Provisional application No. 60/169,704, filed on Dec. 8, 1999.

(51) Int. Cl.$^7$ .................................................. C02F 1/28
(52) U.S. Cl. ....................... 210/673; 210/676; 210/681; 210/267
(58) Field of Search ............................... 210/673, 676, 210/267, 269, 274, 502.1, 681

(56) References Cited

U.S. PATENT DOCUMENTS

| | | | | |
|---|---|---|---|---|
| 4,293,423 A | * | 10/1981 | Kosaka et al. ............... | 210/676 |
| 4,775,484 A | * | 10/1988 | Schmidt et al. ............. | 210/673 |
| 5,681,477 A | * | 10/1997 | Leavitt ........................ | 210/673 |
| 5,733,451 A | * | 3/1998 | Coellner et al. .......... | 210/502.1 |

OTHER PUBLICATIONS

Carta, Giorgio and Pigford, Robert L., Dept. of Chemical Engineering, University of Delaware, Newark, Delaware, "Periodic Countercurrent Operation of Sorption Processes Applied to Water Desalination with Thermally Regenerable Ion–Exchange Resins", May 12, 1986, appeared in *Ind. Eng. Chem. Fundam.* 1986, 25, pp. 677–685; American Chemical Society.

* cited by examiner

*Primary Examiner*—Ivars Cintins
(74) *Attorney, Agent, or Firm*—Akin Gump Strauss Hauer & Feld LLP

(57) ABSTRACT

A process for removing a solute from a fluid process stream containing said solute and containing a solvent. The process comprises (a) continuously contacting the process stream with a portion of a rotating mass of sorbent material at a temperature that allows sorption of the solute by the sorbent material to form a solute-adsorbed portion of sorbent material; (b) continuously rotating the mass of sorbent material; (c) raising the temperature of the solute-adsorbed and rotated portion of sorbent material by contacting said portion with an eluant stream having a temperature that allows release of the solute to form an eluted portion of sorbent material; (d) cooling the further rotated and eluted portion with a cooling stream to form a regenerated portion of sorbent material; simultaneously with steps ad collecting product stream containing solvent, and continuously repeating the above-named steps.

10 Claims, 9 Drawing Sheets

PROCESS FOR CONTINUOUS CHEMICAL SEPARATION

The present application claims the benefit of and priority to U.S. application Ser. No. 60/169,704 entitled PROCESS FOR CONTINUOUS CHEMICAL SEPARATION, filed Dec. 8, 1999.

FIELD OF THE INVENTION

The present invention relates generally to the field of separation technology. More particularly, it concerns a continuous chemical separation process wherein a solute is removed from a fluid process stream by attachment to a sorbent at a liquid-solid interface.

BACKGROUND OF THE INVENTION

Chemical separation processes that utilize solid sorbents to remove solutes from fluids at liquid-solid interfaces employ various methods to contact the fluid process stream with the solid sorbents including continuous methods wherein a moving sorbent bed contacts the process stream and periodic methods wherein fixed beds are contacted with the process stream. Often two fixed bed adsorbers are provided with periodic methods so that one is on stream while the other is being regenerated. If the loading rate of the solute on the sorbent is high, multiple fixed beds may be necessary in order to maintain one in service, and in this case a single continuous unit may be designed to provide the same capacity with reduced capital and space requirements. Continuous processes typically use moving beds of sorbent that are transported in the form of loose granules or pellets, either hydraulically or with mechanical conveyers through the process system apparatus. Though characterized as continuous processes, systems that utilize moving sorbent beds typically interrupt the process fluid flow while the bed is moved. The overall benefits of a continuous process system can be diminished by problems associated with mechanical complexity of equipment, gradual attrition of solid sorbent, limitations in particle size to avoid classification or excessive pressure drop, and channeling of either the process stream or solid sorbent.

Regeneration methods to remove adsorbed solute from the sorbent include pressure swings and temperature swings. Pressure swing techniques are generally limited to closed systems that can be pressurized. Temperature swing techniques are generally limited to the rate of heat transfer for both elevating the temperature and subsequently lowering it.

SUMMARY OF THE INVENTION

Accordingly, the present invention provides a process for removing a solute from a fluid process stream comprising (a) continuously contacting the process stream with a portion of a rotating mass of sorbent material at a temperature that allows sorption of the solute by the Ad sorbent material to form a solute-adsorbed portion of sorbent material; (b) continuously rotating the mass of sorbent material; (c) raising the temperature of the solute-adsorbed and rotated portion of sorbent material by contacting said portion with an eluant stream having a temperature that allows release of the solute to form an eluted portion of sorbent material; and (d) cooling the further rotated and eluted portion with a cooling stream to form regenerated portion of sorbent material; simultaneously with steps a–d collecting product stream containing solvent, and continuously repeating the above-named steps.

The basics of the present invention include adsorbing on a sorbent material a solute from a first fluid stream at a first temperature, desorbing the solute with a second fluid stream at a second temperature which is greater than the first temperature, and regenerating the sorbent material with a third fluid stream at a temperature less then the second temperature. These steps are accomplished by continuously moving the sorbent material and without interruption of the fluid streams.

Following longstanding patent law convention, the terms "a" and "an" mean "one or more" when used in this application, including the claims.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENT

Figure 1:
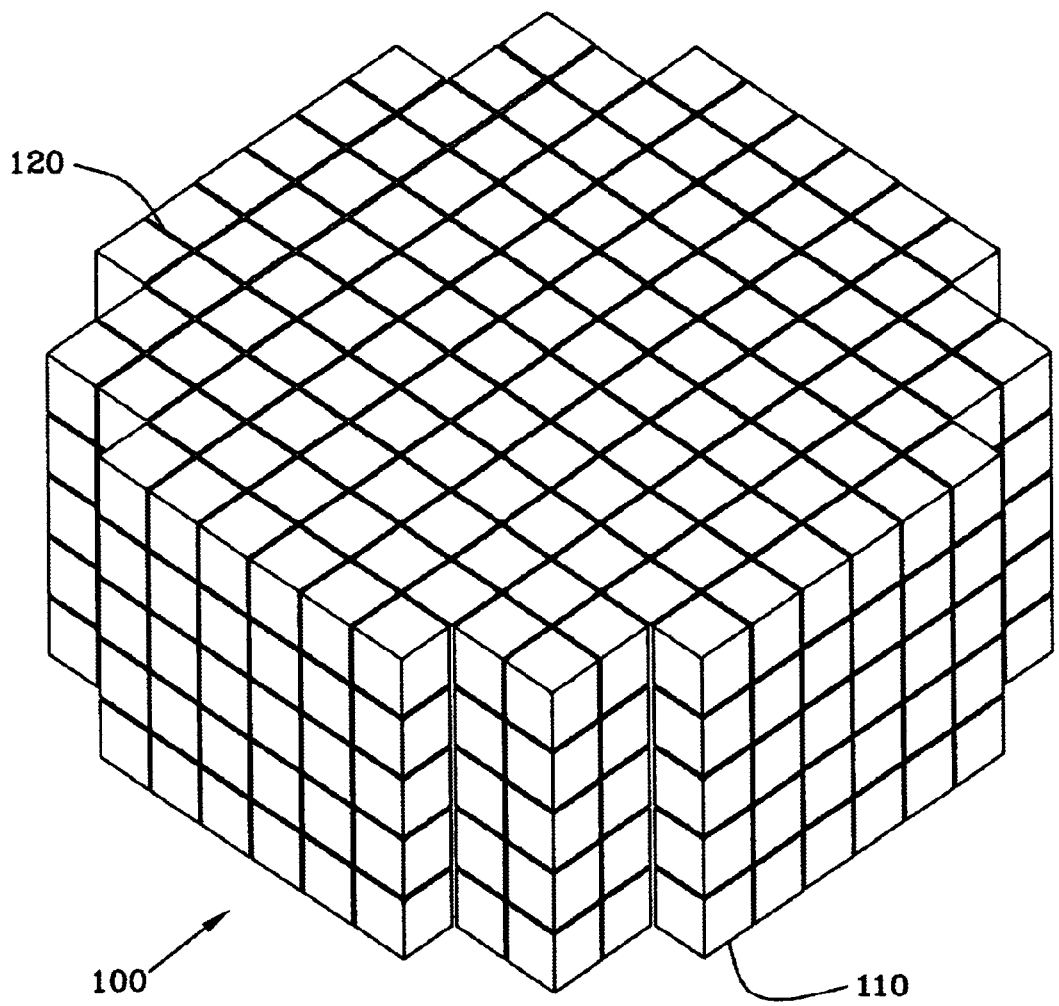
FIG. 1 is a perspective view of one embodiment of a zeolite core comprised of assembled solid individual zeolite elements.

The present invention provides a continuous chemical separation process that removes a solute from a fluid process stream containing said solute and a solvent. The continuous separation process comprises the steps of a) continuously contacting or flowing a process stream containing a solute and a solvent through a portion of a rotating mass of sorbent material at a temperature that allows sorption of the solute by the sorbent material to form a solute-adsorbed portion of sorbent material, b) continuously rotating the mass of sorbent material, c) raising the temperature of the solute-adsorbed and rotated portion of sorbent material by contacting said portion with an eluant stream having a temperature that allows release of the solute to form an eluted portion of sorbent material, d) cooling the further rotated and eluted portion with a cooling stream to form a regenerated cooled portion of sorbent material, e) simultaneously with steps a–d, collecting product stream containing solvent and/or collecting elution stream containing solute, and f) continuously repeating steps a–e. Advantages of the present process include the complementarity of the method by which the temperature of the sorbent material is manipulated and the method used to contact the sorbent material with the process stream. For example, engineered flow paths in the solid core create a minimal pressure drop free flow path for a cooling stream of dry air.

The process of the invention is useful for separation of a variety of solutes from a variety of solutions containing those solutes using a variety of sorbent materials. The sorbent material has a surface that takes up and holds solutes, and includes zeolites, ion exchange resins, activated carbon, and activated alumina, for example. A solute is a dissolved substance; soluable substances include gases and solid salts, organic and inorganic compounds. A solution is a dissolved mixture of a solute and a solvent. In a preferred embodiment, a substantially solid zeolite sorbent material (zeolite) is used for removal of dissolved salt from saltwater (process stream).

The capacity of zeolite to adsorb salt comprising ions over a range of temperature from the boiling point of water to the freezing point of water at atmospheric pressure varies significantly and is the mechanism exploited to drive the process. The temperature at which a particular system is operated depends on the setting, the desired output purity, and the economics of the required energy consumption. In a preferred embodiment, temperatures at the high end of the above-named range are low enough to allow use of heat energy from a wide variety of sources including waste heat and solar or renewable sources to provide heat for the eluant stream.

Following is a description of a test procedure used to investigate the temperature dependence of synthetic seawater sorption on zeolite, the results of which are presented in Table 2. The results are also presented graphically in FIG. 4, with all concentrations of Na+ measured plotted vs. temperature, and showing the temperature-concentration relationship with Na+ salt concentrations in the solute being depressed at lower temperatures.

Approximately 800 mL of zeolite material was rinsed with 1 L of deionized water several times a day at 95° C. over a period of four days in an attempt to remove as much of the soluble material as possible. After each rinse step, most of the rinse solution was decanted and allowed to cool to room temperature for measurement of conductivity, and replaced with about 1 L of deionized water. The measured conductivity ranged from about 200 to 280 $\mu$S/cm during the first day, and 130 to 200 $\mu$S/cm during the second day. The conductivity leveled-off after the second day, with a final conductivity measured during the fourth day of 130 $\mu$S/cm. Mass to volume (M/V) (g solid/g solution) ratios of 10/17, 10/85, and 10/170 were used for the experiments. The values covered a factor of 10 range in M/V ratios, and the highest M/V ratio (10/17) allowed three duplicate 1-mL samples to be taken during the course of the experiment.

Simulated seawater was prepared from reagent grade chemicals, the composition of which is presented in Table 1. The synthetic seawater was filtered (0.45 micron) and was sampled for chemical analysis prior to use in the experiments. The experiments were conducted at 0° C., 25° C., 50° C., 75° C., and 95° C. Weighed amounts of the solid were reacted with weigh amounts of simulated seawater in polypropylene bottles (at 0° C., 25° C., 50° C., 75° C.) or teflon bottles (at 95° C.). Experiments at 25° C., 50° C., and 75° C. were conducted in constant temperature shaker water baths. Experiments at 0° C. were conducted in a shaker bath with iced water. For the experiments at 95° C., the teflon bottles containing the solid+solution mixture were placed in a laboratory oven (nonagitated). After the start of the experiments, duplicate aqueous samples, filtered through a 0.2-micron syringe filter, were taken from each solid+ solution mixture at approximately 4, 29, and 48 hours. Each sample was diluted by a factor of 25 by taring ~1 g of the sample and ~24 g of deionized water into 25-mL polypropylene bottles. The concentrations of Na+, K+, Mg++, Ca++, Cl −, and SO4−− in solution were measured using capillary electrophoresis.

TABLE 1

Synthetic Sea water

| K+ (moles/liter) | Na+ (moles/liter) | Mg++ (moles/liter) | Ca++ (moles/liter) | Cl− (moles/liter) | SO4−− (moles/liter) | Total Sum (moles/liter) |
|---|---|---|---|---|---|---|
| 0.0087 | 0.4316 | 0.051 | 0.0064 | 0.4506 | 0.0209 | 0.9692 |

TABLE 2

Results of Sorption Test

| Time | K+ | Na+ | Mg++ | Ca++ | Cl— | SO4— | Total Sum | T.C | M/V |
|---|---|---|---|---|---|---|---|---|---|
| 0 | 0.0087 | 0.4316 | 0.051 | 0.0064 | 0.4506 | 0.0209 | 0.9692 | 0 | 0 |
| 4 | 0.0069 | 0.4108 | 0.0448 | 0.0244 | 0.4664 | 0.0221 | 0.9754 | 0 | 1.7 |
| 29 | 0.0013 | 0.4105 | 0.0472 | 0.0475 | 0.4609 | 0.0213 | 0.9887 | 0 | 1.7 |
| 48 | 0.0012 | 0.345 | 0.0449 | 0.0186 | 0.4564 | 0.0215 | 0.8876 | 0 | 1.7 |
| 4 | 0.0098 | 0.427 | 0.0339 | 0.0111 | 0.4687 | 0.0216 | 0.9721 | 0 | 8.5 |
| 29 | 0.0013 | 0.436 | 0.0489 | 0.0166 | 0.4654 | 0.0212 | 0.9894 | 0 | 8.5 |
| 48 | 0.0013 | 0.4071 | 0.0473 | 0.0248 | 0.4517 | 0.0208 | 0.953 | 0 | 8.5 |
| 4 | 0.0053 | 0.4265 | 0.0492 | 0.0073 | 0.4679 | 0.0217 | 0.9779 | 0 | 17 |
| 29 | 0.0026 | 0.4365 | 0.0488 | 0.0103 | 0.4573 | 0.0218 | 0.9773 | 0 | 17 |
| 48 | 0.0012 | 0.4342 | 0.049 | 0.0144 | 0.4647 | 0.0216 | 0.9851 | 0 | 17 |
| 4 | 0.0107 | 0.3591 | 0.048 | 0.1153 | 0.472 | 0.0213 | 1.0264 | 25 | 1.7 |
| 29 | 0.0013 | 0.344 | 0.0463 | 0.1086 | 0.4753 | 0.0218 | 0.9973 | 25 | 1.7 |
| 48 | 0.0013 | 0.3412 | 0.0471 | 0.0877 | 0.4881 | 0.0227 | 0.9881 | 25 | 1.7 |
| 4 | 0.0016 | 0.4246 | 0.0511 | 0.0173 | 0.466 | 0.021 | 0.9816 | 25 | 8.5 |
| 29 | 0.0013 | 0.4091 | 0.0503 | 0.0263 | 0.462 | 0.0214 | 0.9704 | 25 | 8.5 |
| 48 | 0.0013 | 0.41 | 0.0386 | 0.0289 | 0.467 | 0.0217 | 0.9675 | 25 | 8.5 |
| 4 | 0.0078 | 0.5137 | 0.0495 | 0.0125 | 0.5527 | 0.0211 | 1.1573 | 25 | 17 |
| 29 | 0.0034 | 0.4102 | 0.048 | 0.0165 | 0.4633 | 0.0211 | 0.9625 | 25 | 17 |
| 48 | 0.0013 | 0.4068 | 0.0484 | 0.0303 | 0.4708 | 0.0209 | 0.9785 | 25 | 17 |
| 4 | 0.0045 | 0.4187 | 0.0505 | 0.0768 | 0.5477 | 0.0243 | 1.1225 | 50 | 1.7 |

TABLE 2-continued

Results of Sorption Test

| Time | K+ | Na+ | Mg++ | Ca++ | Cl— | SO4— | Total Sum | T.C | M/V |
|---|---|---|---|---|---|---|---|---|---|
| 29 | 0.0013 | 0.3696 | 0.0399 | 0.0749 | 0.4922 | 0.0226 | 1.0005 | 50 | 1.7 |
| 48 | 0.0019 | 0.415 | 0.0506 | 0.0193 | 0.4446 | 0.0203 | 0.9517 | 50 | 1.7 |
| 4 | 0.0013 | 0.4523 | 0.0546 | 0.0229 | 0.5013 | 0.0223 | 1.0547 | 50 | 8.5 |
| 29 | 0.0013 | 0.4179 | 0.0342 | 0.0303 | 0.4735 | 0.0218 | 0.979 | 50 | 8.5 |
| 48 | 0.0014 | 0.4493 | 0.051 | 0.0346 | 0.5016 | 0.024 | 1.0619 | 50 | 8.5 |
| 4 | 0.0012 | 0.4525 | 0.0546 | 0.0156 | 0.488 | 0.0221 | 1.034 | 50 | 17 |
| 29 | 0.0024 | 0.4199 | 0.0497 | 0.0284 | 0.4745 | 0.0214 | 0.9963 | 50 | 17 |
| 48 | 0.0028 | 0.4159 | 0.048 | 0.0194 | 0.5282 | 0.0192 | 1.0335 | 50 | 17 |
| 4 | 0.0095 | 0.4321 | 0.0512 | 0.0179 | 0.4724 | 0.0218 | 1.0049 | 75 | 1.7 |
| 29 | 0.0013 | 0.5488 | 0.0196 | 0.0629 | 0.488 | 0.0171 | 1.1377 | 75 | 1.7 |
| 48 | 0.0012 | 0.4327 | 0.0174 | 0.0709 | 0.4448 | 0.0211 | 0.9881 | 75 | 1.7 |
| 4 | 0.0028 | 0.4255 | 0.0465 | 0.0251 | 0.4659 | 0.0216 | 0.9874 | 75 | 8.5 |
| 29 | 0.0023 | 0.4161 | 0.0398 | 0.0289 | 0.463 | 0.0215 | 0.9716 | 75 | 8.5 |
| 48 | 0.0023 | 0.416 | 0.0381 | 0.031 | 0.4389 | 0.0219 | 0.9482 | 75 | 8.5 |
| 4 | 0.0016 | 0.4111 | 0.0323 | 0.0643 | 0.7098 | 0.0247 | 1.2438 | 75 | 17 |
| 29 | 0.003 | 0.4252 | 0.0445 | 0.019 | 0.4638 | 0.0214 | 0.9769 | 75 | 17 |
| 48 | 0.0032 | 0.4198 | 0.0447 | 0.0231 | 0.4662 | 0.0219 | 0.9789 | 75 | 17 |
| 4 | 0.0026 | 0.4408 | 0.0244 | 0.0487 | 0.4702 | 0.0216 | 1.0083 | 95 | 1.7 |
| 29 | 0.002 | 0.3074 | 0.012 | 0.0569 | 0.467 | 0.0215 | 0.8668 | 95 | 1.7 |
| 48 | 0.003 | 0.4448 | 0.0107 | 0.0592 | 0.4829 | 0.0208 | 1.0214 | 95 | 1.7 |
| 4 | 0.0046 | 0.564 | 0.0471 | 0.0147 | 0.5608 | 0.0214 | 1.2126 | 95 | 8.5 |
| 29 | 0.0038 | 0.4193 | 0.038 | 0.0222 | 0.4405 | 0.0208 | 0.9446 | 95 | 8.5 |
| 48 | 0.0039 | 0.4288 | 0.0337 | 0.0277 | 0.4706 | 0.0226 | 0.9873 | 95 | 8.5 |
| 4 | 0.0051 | 0.4462 | 0.0473 | 0.0148 | 0.4614 | 0.0209 | 0.9957 | 95 | 17 |
| 29 | 0.0056 | 0.5465 | 0.0529 | 0.027 | 0.5908 | 0.027 | 1.2498 | 95 | 17 |
| 48 | 0.0054 | 0.4323 | 0.0375 | 0.0213 | 0.463 | 0.0233 | 0.9828 | 95 | 17 |

Figure 8:
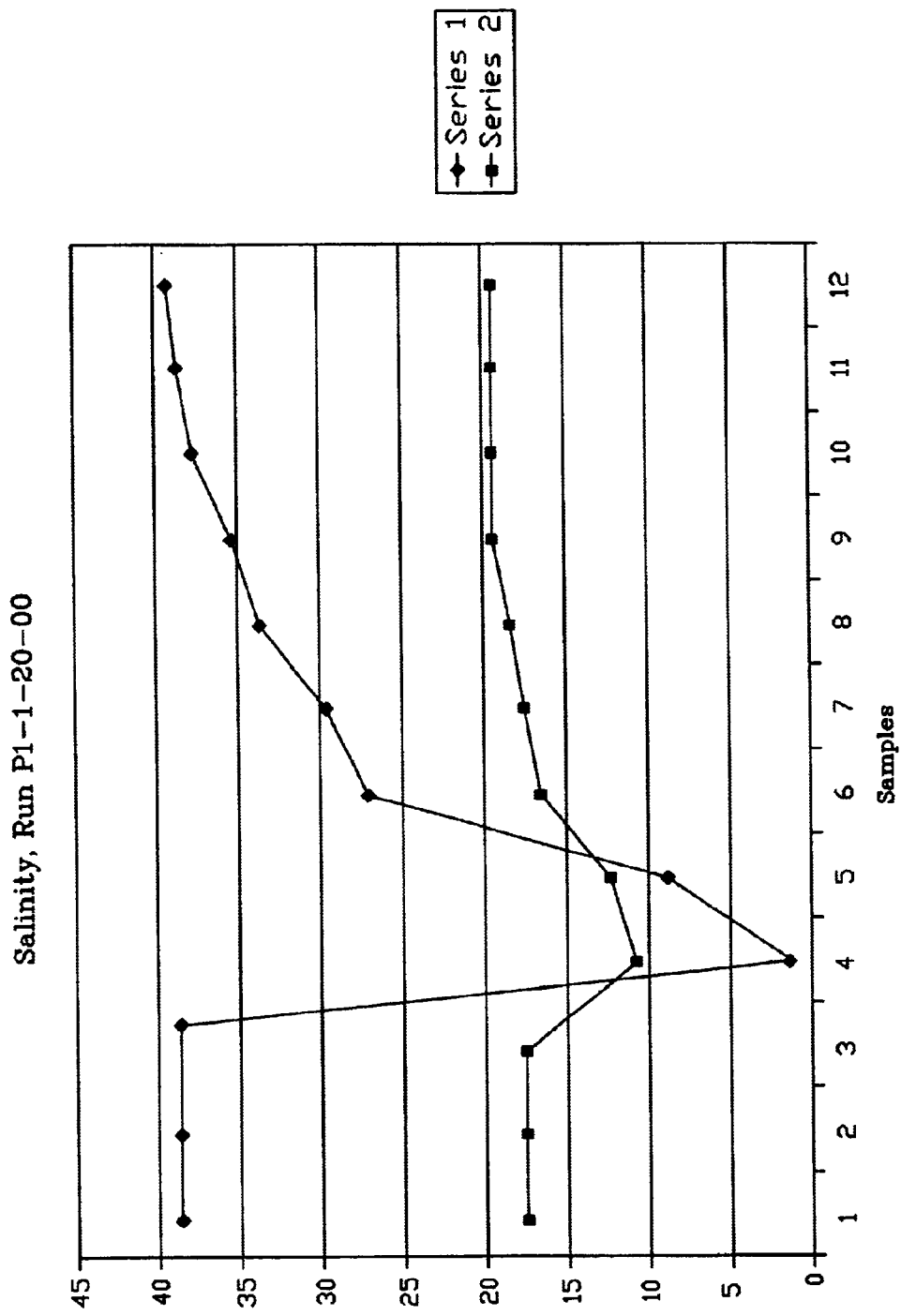
FIG. 8 is a graph depicting data presented in Table 3.
Figure 9:
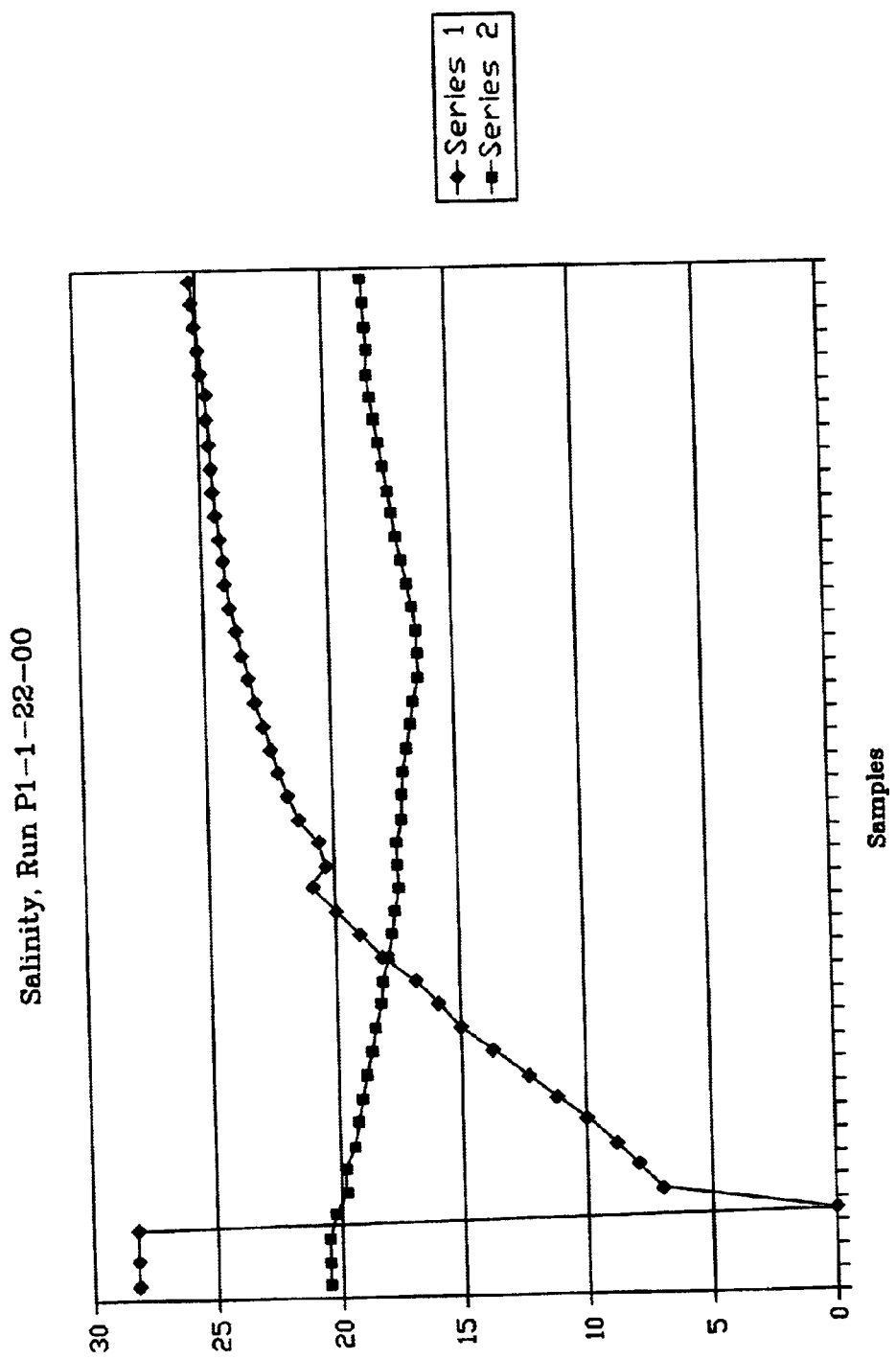
FIG. 9 is a graph depicting data presented in Table 4.

A test also was conducted wherein a NaCl solution was passed through zeolite after an elevated temperature rinse with distilled water and subsequent cooling with a dry air stream. For the test a PVC plastic column (FIG. 5) with inside diameter of 1.5 inches and length of 30 inches was packed with 10 mesh zeolite granules. The column was clamped with the length vertical and fitted with two ports at each end. In the first step one upper end port was used to receive a distilled water eluent stream at 80° C. and one lower port was used to drain the eluent stream. In the second step one lower port was used to receive a cooling dry air stream and one upper port was used to exhaust the cooling dry air stream. In the third step one lower port was used to receive a test stream and an upper port was used to output the test stream to a conductivity measuring probe. Information concerning the characteristics of the streams is presented in Table 3 and Table 4. The data presented in table 3 and Table 4 is depicted graphically in FIG. 8 and FIG. 9.

TABLE 3

Column Test
Column Test −10 mesh Clino #3
Run P1-1-20-00
1.5" × 30" column prepared
with 10 BV 80° C. distilled water
rinse upflow 10 ml/s column dried/cooled
with 1.0 cfm −60° F. dewpoint air flow
followed by 3 ml/s process solution downflow
Base Solution 39.1 ppt 17.5° C.

| PPT | T° C. | ml |
|---|---|---|
| 39.1 | 17.5 | 0 |
| 39.1 | 17.5 | 0 |
| 39.1 | 17.5 | 0 |
| 1.2 | 10.7 | 120 |
| 9 | 12.1 | 300 |
| 26.8 | 16.7 | 430 |
| 29.4 | 17.3 | 490 |
| 32.9 | 17.9 | 590 |

TABLE 3-continued

Column Test
Column Test −10 mesh Clino #3
Run P1-1-20-00
1.5" × 30" column prepared
with 10 BV 80° C. distilled water
rinse upflow 10 ml/s column dried/cooled
with 1.0 cfm −60° F. dewpoint air flow
followed by 3 ml/s process solution downflow
Base Solution 39.1 ppt 17.5° C.

| PPT | T° C. | ml |
|---|---|---|
| 35.2 | 18.8 | 710 |
| 37.7 | 18.8 | 940 |
| 38 | 19 | 1010 |
| 38.4 | 18.9 | 1100 |

TABLE 4

Column Test
Column Test −10 mesh Clino #3
Run P1-1-22-00
1.5" × 30" column prepared
with 10 BV 80° C. distilled water
rinse upflow 10 ml/s column dried/cooled
with 1.0 cfm −60° F. dewpoint air
flow, then sat overnight followed by
3 ml/s process solution upflow
Base Solution 28.3 ppt 20.6° C.

| PPT | T° C. | ml |
|---|---|---|
| 28.3 | 20.6 | 0 |
| 28.3 | 20.6 | 0 |
| 28.3 | 20.6 | 0 |
| 0 | 20.3 | |
| 6.8 | 19.7 | |
| 7.8 | 19.6 | |
| 9 | 19.5 | |
| 10 | 19.4 | |

TABLE 4-continued

Column Test
Column Test –10 mesh Clino #3
Run P1-1-22-00
1.5" × 30" column prepared
with 10 BV 80° C. distilled water
rinse upflow 10 ml/s column dried/cooled
with 1.0 cfm –60° F. dewpoint air
flow, then sat overnight followed by
3 ml/s process solution upflow
Base Solution 28.3 ppt 20.6° C.

| PPT | T° C. | ml |
|---|---|---|
| 11 | 19.3 | |
| 12 | 19.1 | |
| 13 | 19 | |
| 14 | 18.9 | |
| 15 | 18.7 | |
| 16 | 18.6 | |
| 17 | 18.4 | 220 |
| 18.4 | 18.2 | |
| 19.5 | 17.9 | |
| 20 | 17.8 | |
| 21 | 17.5 | |
| 20.7 | 17.6 | |
| 21 | 17.5 | |
| 21.7 | 17.2 | |
| 22 | 17.2 | |
| 22.4 | 17.1 | |
| 23 | 17.1 | |
| 23.2 | 17 | |
| 23.5 | 17 | |
| 23.7 | 17 | |
| 23.8 | 17 | |
| 23.9 | 17 | |
| 24 | 17.1 | 480 |
| 24.1 | 17.2 | |
| 24.2 | 17.3 | |
| 24.4 | 17.4 | |
| 24.5 | 17.4 | |
| 24.5 | 17.5 | |
| 24.5 | 17.6 | |
| 24.6 | 17.7 | |
| 24.7 | 17.8 | |
| 24.8 | 17.8 | |
| 24.9 | 17.8 | |
| 25 | 17.8 | |
| 25.1 | 17.9 | |
| 25.2 | 18 | 560 |

As used herein, the term "zeolite" means a three dimensional, microporous, crystalline solid that includes aluminum, silicon and oxygen in a regular framework. Zeolite material may be shaped into a substantially solid piece or element. Channels and passages within the zeolite element may be formed, for example, by machining, extruding, or pressing to form, for example, core 100 (FIG. 1) comprised of assembled substantially solid individual zeolite elements 110 (FIG. 1). Flow paths or channels may be constructed through core 100 by leaving spaces 120 (FIG. 1) between the individual elements of zeolite or channels may be constructed in the individual elements themselves providing additional flow paths through the core. Alternatively, the core may be one solid piece with channels provided through it or having sufficient porosity or permeability to permit fluid to pass directly through the matrix of the material.

Figure 2:
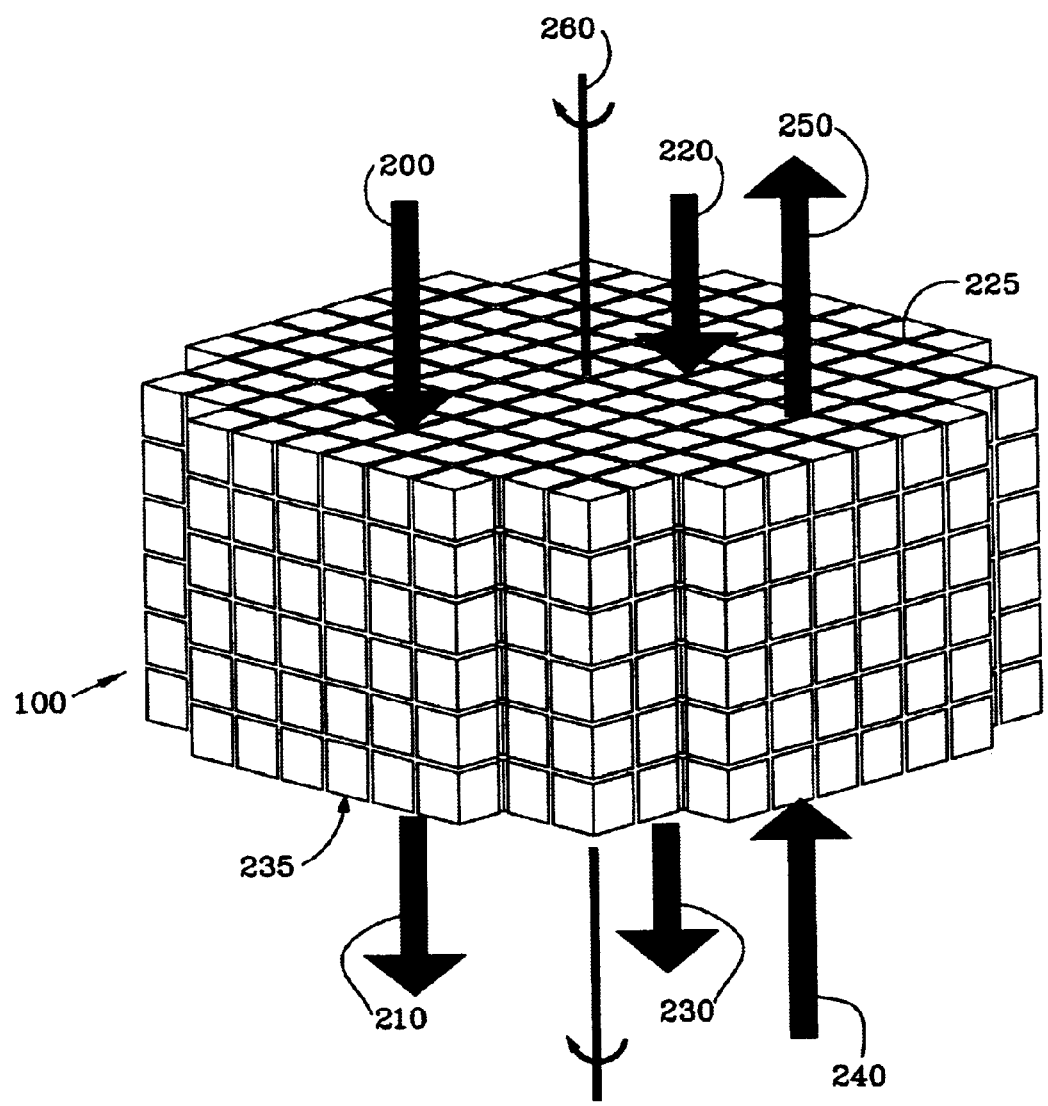
FIG. 2 depicts a rotating core with process, elution, and cooling streams flowing through the core parallel to the axis of rotation.

Core 100 is rotated during use as shown in FIG. 2, such as by a motor driven axle on which the core 100 is mounted, for example. Core 100 has an axis of rotation 260 shown as clockwise, however, the axis of rotation may be counter-clockwise where the respective placement of the process, eluant, and cooling streams is reversed.

Referring to FIG. 2, core 100 is simultaneously contacted with an inlet process stream 200, an inlet eluant stream 220, and an inlet cooling stream 240. Core 100 has an outlet process stream 210, an outlet elution stream 230 and an outlet cooling stream 250. The outlet streams are generally on opposite sides of the core from the inlet streams. Core 100 is rotated (FIG. 2) while being contacted by the three streams that flow through it and parallel to the axis of rotation. In one embodiment of the invention, inlet process stream 200 and inlet eluant stream 220 contact and enter the core from a first side 225 (FIG. 2), and are pulled, for example by gravity, through core 100 while remaining separate (unmixed), and exit a second side 235 of core 100 opposite the first side 225 in separate collectable eluates, outlet process stream 210 and outlet elution stream 230. Cooling stream 240 may flow in the same direction or in the opposite direction as process stream 200 and eluant stream 220, as it traverses the core sorbent material. Cooling stream 240 may evolve from a source in a location that allows for forces of buoyancy or a chimney effect to facilitate flow through core 100.

As used herein, "stream" means a fluid, i.e., a liquid or a gas. In particular, the inlet process stream is a solution containing a solute to be removed. Preferably, the inlet process stream is an aqueous solution and the solute is a mineral or a salt. Most preferably, the solution is salt water and the solute is sodium chloride or sodium ions. The outlet process stream is another name for the product stream and is the solvent of the solution. In the most preferred embodiment, the product stream is purified water.

The inlet elution stream is similar in composition to the process stream but at an elevated temperature compared to the temperature of the process stream. The eluant stream may be the process stream or a component thereof, the product stream, or a third source and may contain additives to help maintain the condition of the core or aid the elution. A preferred eluant stream is water.

The cooling stream has the property of cooling the core to a temperature that enables adsorption of the solute from the solution. In particular, the portion of the core that is in need of cooling is that portion that has just been eluted and rotated. Preferably, the cooling stream is a gas and most preferably, is dried air.

Process stream 200 (FIG. 2) is maintained at a temperature that is suitable for adsorption of solute onto the core sorbent material. In the preferred embodiment for the separation of sodium chloride from saltwater, the process stream temperature may be between 0° C. and 100° C. Eluant stream 220 is maintained at a temperature that is greater than the process stream temperature and that promotes desorption of the solute from the core material. Changing the temperature of the eluant stream changes the capacity of zeolite to adsorb and desorb solute and may be taken advantage of in the present invention. Cooling stream 240 is at a temperature that returns core 100 to a temperature that allows adsorption of solute. In a preferred embodiment, the cooling stream is a dry gas (air) that produces evaporative cooling while moving through the core. A cooled liquid stream or cooled gas stream may be used instead of or in conjunction with a dry gas stream.

Figure 3:
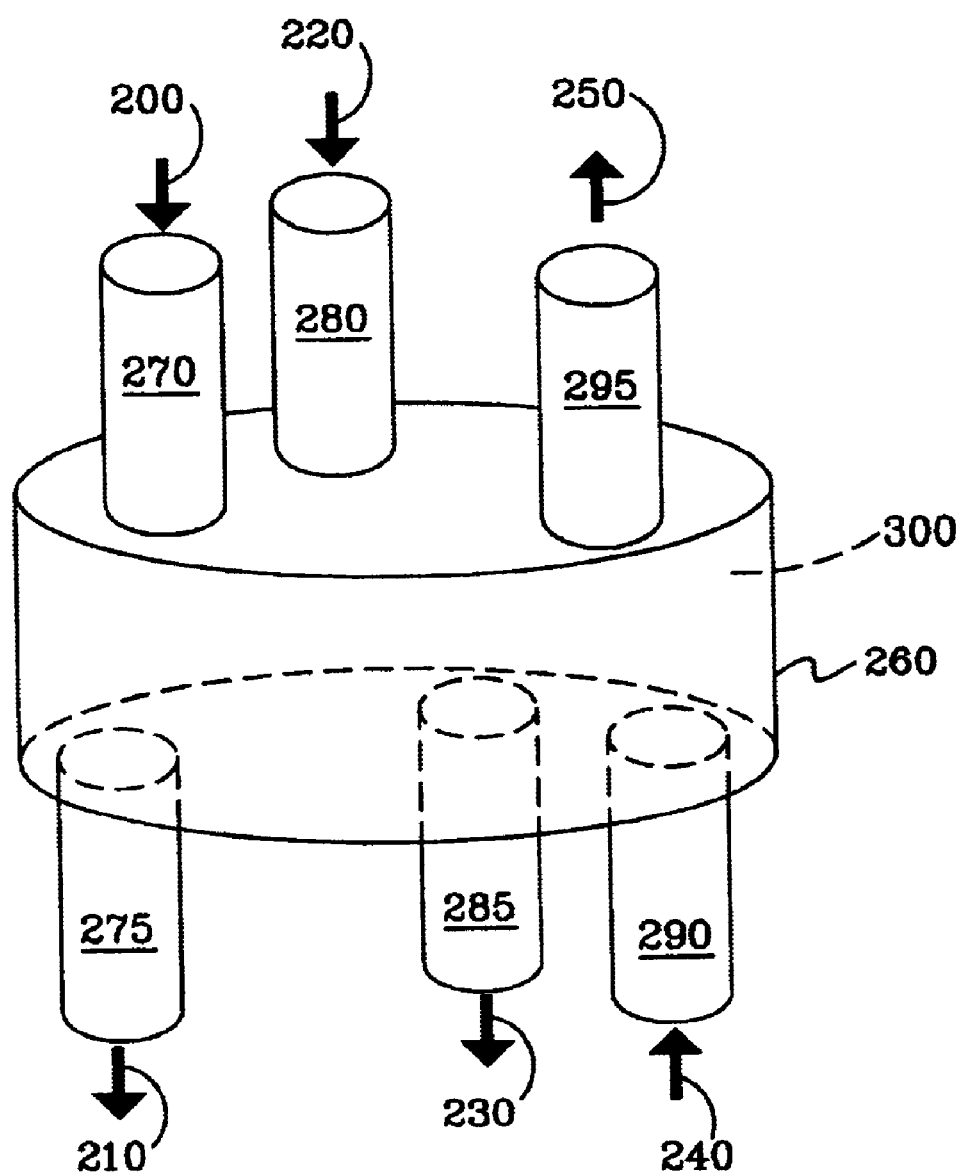
FIG. 3 is a perspective view of a housing or enclosure for the embodiment of FIG. 2.

Core sorbent material 100, or 300 (FIG. 3), may be contained in an enclosure 260 (FIG. 3) to avoid contamination, to facilitate precise temperature control, to include plumbing such as inlet stream tubes 270, 280, 290, (having respective passageways therethrough) and outlet stream tubes 275, 285, and 295 (having respective passageways therethrough) (FIG. 3) for delivery of process, eluant and cooling streams, and for collection of product, elution, and product cooling streams.

The present process may be scaled to accommodate a process stream input rate of several gallons per day to millions of gallons per day. A rate of input is too fast if the desired product is impure. A rate of input is too slow if no product is obtained.

It is believed that the above described method of contacting the process stream with a sorbent mass comprised of individual sorbent elements can be optimized for particular settings and tasks, such as solution characteristics, output requirements, and environment by means including utilization of sorbent material with different physical and sorption characteristics, and various element shape, size, orientation, and spacing. By changing the physical shape of the elements and their orientation and spacing relative to each other when assembled as a core, flow paths can be altered and optimized for the desired process performance.

Figure 4:
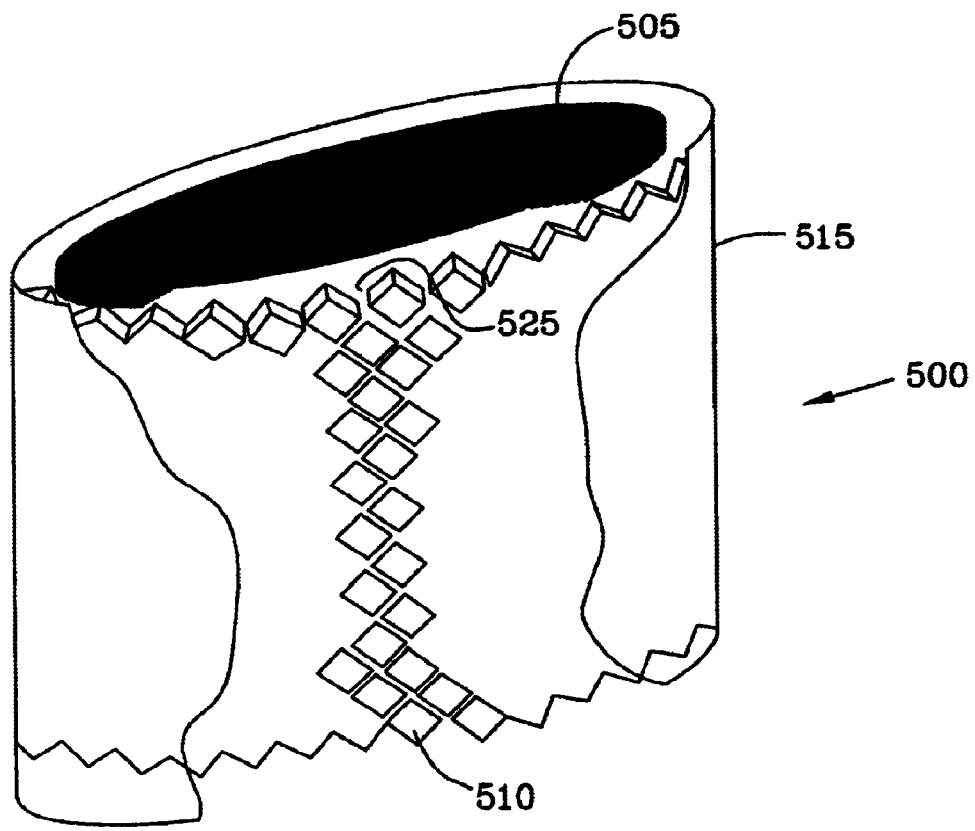
FIG. 4 is a perspective view of a preferred embodiment of a cylindrical zeolite core comprised of assembled solid individual zeolite elements attached to an inner cylinder and contained by an outer cylinder.

Referring to FIG. 4, a preferred embodiment of the rotating mass of sorbent is comprised of a cylindrical core 500 constructed of individual zeolite elements 510 attached to an inner cylinder 505 and enclosed by an outer cylinder 515. Cylinders 505 and 515 are constructed of rigid, inert, impermeable material, such as stainless steel sheet and function to support zeolite elements 510 and form annulur channel 525 with fluid flow paths or channels between the elements 510. Channel 525 contains all process flows within core 500 to be in contact with elements 510.

Figure 5:
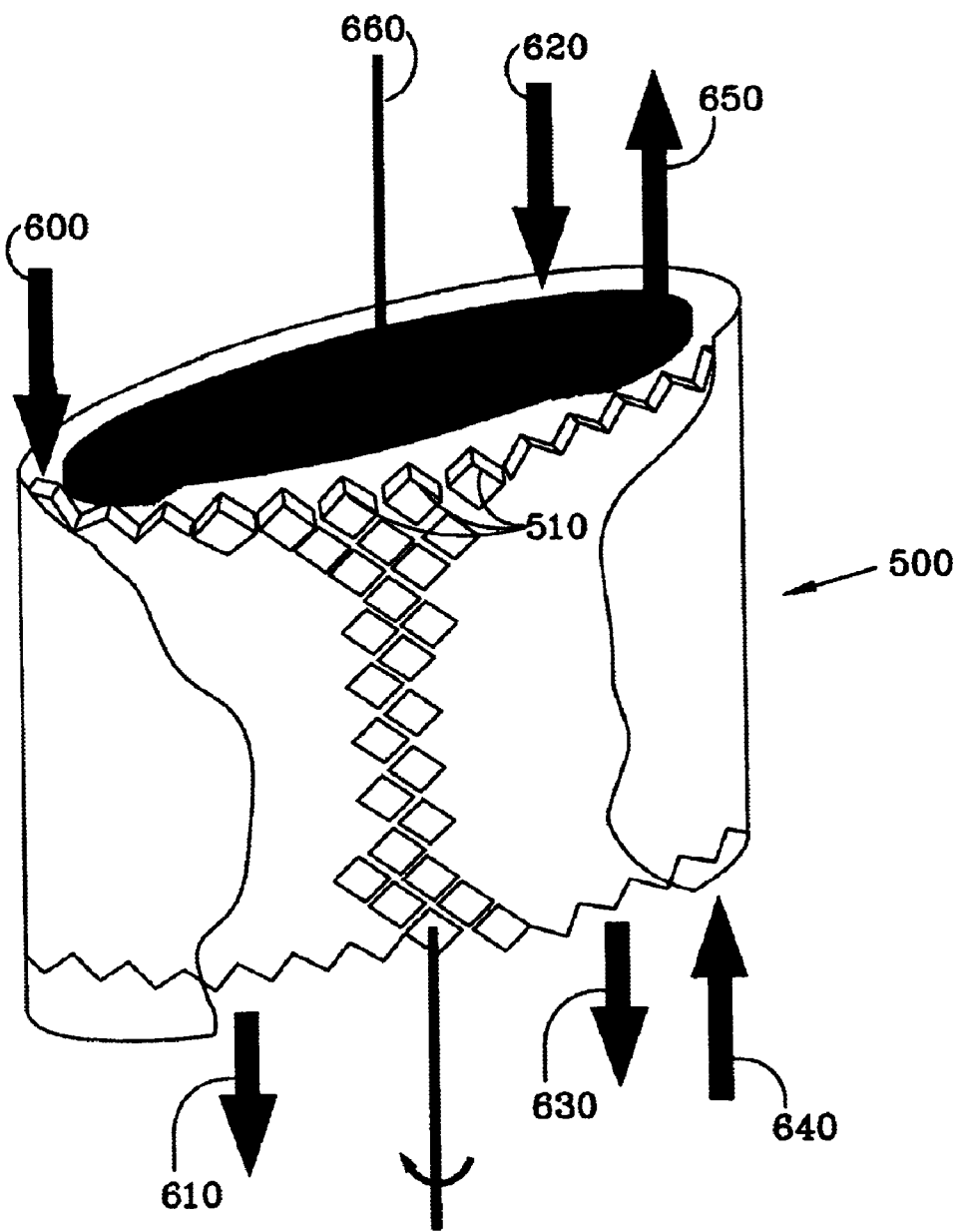
FIG. 5 depicts the rotating core for the embodiment of FIG. 4 with process, elution, and cooling streams flowing through the core parallel to the axis of rotation.
Figure 6:
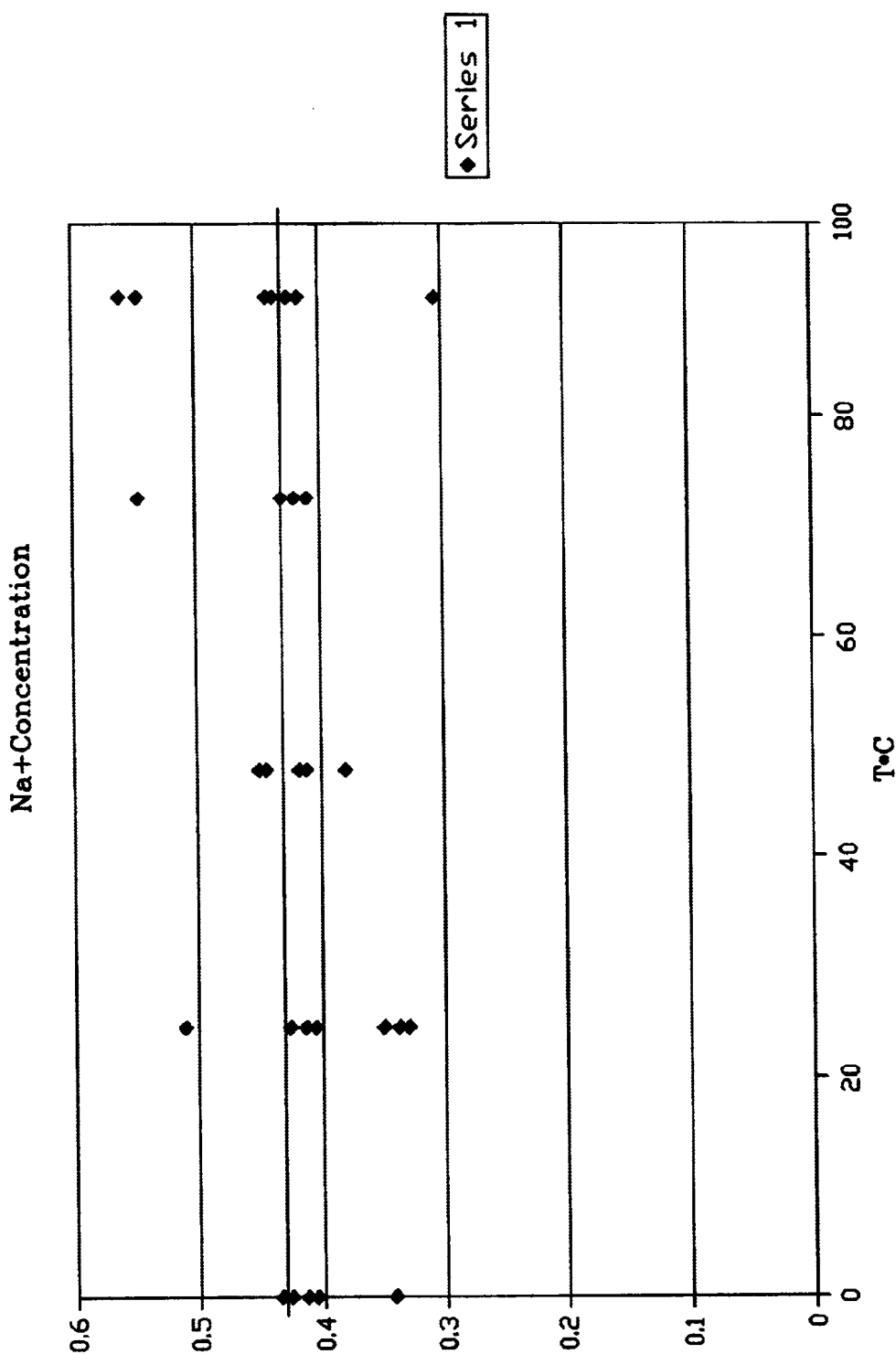
FIG. 6 is a graph depicting data presented in Table 1 and Table 2. The horizontal line between 0.4 and 0.5 represents the sodium concentration in synthetic seawater.
Figure 7:
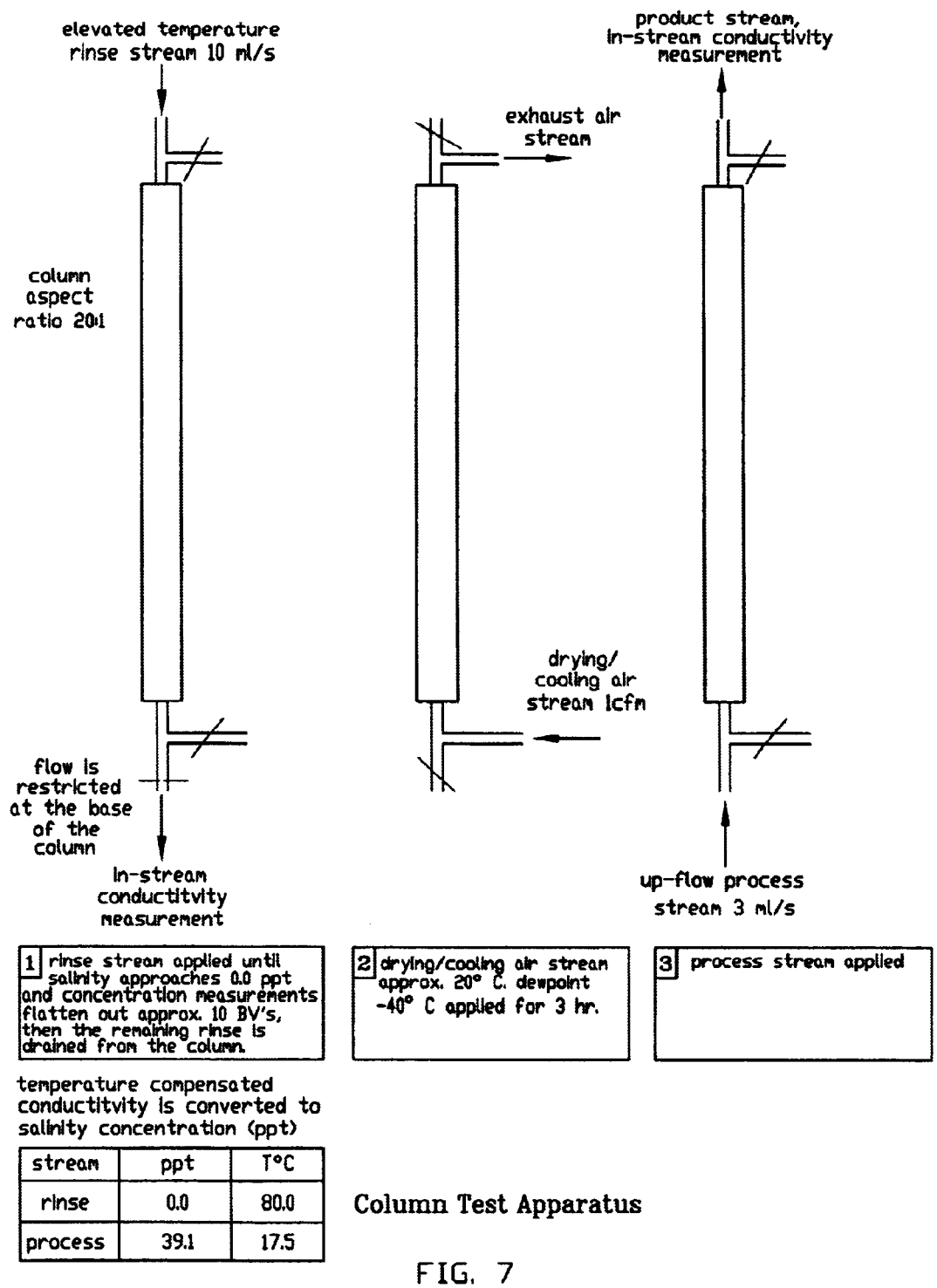
FIG. 7 depicts a setup of the column test producing the data in Table 3 and Table 4.

Referring to FIG. 5, core 500 is simultaneously contacted with an inlet process stream 600, an inlet eluant stream 620, and an inlet cooling stream 640. Core 500 has an outlet process stream 610, an outlet elution stream 630 and an outlet cooling stream 650. The outlet streams are generally on opposite sides of the core as the inlet streams. Elements 510 are positioned around the circumference of cylinder 505 intermediate to the respective inlet and outlet streams. Core 500 is rotated (FIG. 5) while being contacted by the three streams that flow through it and parallel to the axis of rotation. The orientation of elements 510 as depicted in FIG. 5 increases the overall length of the flow paths of all streams through core 500 as compared to a straight flow path. The resulting flow paths cause the streams to cascade from one element to the next, enhancing the intimate contact of the stream with the elements 510.

Even though the invention has been described with a certain degree of particularity, it is evident that many alternatives, modifications, and variations will be apparent to those skilled in the art in light of the foregoing disclosure. Accordingly, it is intended that all such alternatives, modifications, and variations which fall within the spirit and the scope of the invention be embraced by the defined claims.

What is claimed is:

1. A process for removing a solute from a liquid process stream containing said solute and containing a solvent, comprising:
    a) continuously contacting said process stream with a portion of a rotating mass of sorbent material at a temperature that allows sorption of said solute by said sorbent material to form a solute-adsorbed portion of sorbent material and a product stream comprising solvent which simultaneously exits said rotating mass and is collected;
    b) continuously rotating said mass of sorbent material;
    c) raising the temperature of said solute-adsorbed and rotated portion of sorbent material by contacting said portion with an eluant stream which is separate from said process stream and has a temperature that allows release of said solute to form an eluted portion of sorbent material;
    d) cooling the eluted portion of sorbent material with a gas cooling stream, wherein said gas cooling stream produces evaporative cooling to form a regenerated portion of sorbent material;
    e) simultaneously with steps a–d, collecting product stream comprising solvent; and
    f) continuously repeating steps a–e.

2. The process of claim 1 wherein said process stream comprises salt water, said solute comprises sodium ions, and said solvent is water.

3. The process of claim 1 wherein said sorbent material is comprised of solid zeolite elements assembled into a core with channels formed by spacing between the elements.

4. The process of claim 1 wherein the cooling stream is dried air.

5. A process for removing a solute from a liquid process stream containing said solute and containing a solvent, comprising:
    a) continuously contacting said process stream with a portion of a rotating mass of sorbent material at a temperature that allows adsorption of said solute to the sorbent material to form a solute-adsorbed portion of sorbent material and a product stream comprising solvent which simultaneously exits said rotating mass and is collected;
    b) continuously rotating said mass of sorbent material during the solute removal process;
    c) raising the temperature of said solute-adsorbed and rotated portion of sorbent material by contacting said portion with an eluant stream which is separate from said process stream and has a temperature that allows release of the solute to form an eluted portion of sorbent material;
    d) cooling the further rotated and eluted portion of sorbent material with a gas cooling stream, wherein said gas cooling stream produces evaporative cooling to form a regenerated portion of sorbent material;
    e) simultaneously with steps a–d, collecting product stream comprising solvent; and
    f) continuously repeating steps a–e.

6. The process of claim 5 wherein said process stream comprises salt water, said solute comprises sodium ions, and said solvent is water.

7. The process of claim 5 wherein said cooling stream is dried air.

8. A chemical separation process, comprising:
    adsorbing on a sorbent material a solute from a first liquid stream at a first temperature;
    desorbing said solute with a second liquid stream, which is separate from said first liquid stream, at a second temperature which is greater than said first temperature; and
    regenerating said sorbent material with a gas stream, wherein said gas stream produces evaporative cooling to form a regenerated portion of said sorbent material, said adsorbing, desorbing, and regeneration steps accomplished by continuously rotating said sorbent material without interruption of said streams.

9. A process for removing a solute from a liquid process stream containing said solute and containing a solvent, comprising:
    a) continuously contacting said process stream with a portion of a rotating mass of sorbent material at a temperature that allows sorption of said solute by said sorbent material to form a solute-adsorbed portion of sorbent material, and a product stream comprising solvent which simultaneously exits said rotating mass and is collected, wherein said process stream is salt water, said solute comprises sodium ions, and said solvent is water, and said sorbent material is comprised of solid zeolite elements assembled into a core with channels formed between said elements;

b) continuously rotating said mass of sorbent material;

c) raising the temperature of said solute-adsorbed and rotated portion of sorbent material by contacting said portion with an eluant stream which is separate from said process stream and has a temperature that allows release of said solute to form an eluted portion of sorbent material;

d) cooling the further rotated and eluted portion of sorbent material with a gas cooling stream, wherein said gas cooling stream produces evaporative cooling to form a regenerated portion of sorbent material;

e) simultaneously with steps a–d, collecting product stream comprising solvent; and f) continuously repeating steps a–e.

10. A process for removing a solute from a liquid process stream containing said solute and containing a solvent, comprising:

a) continuously contacting said process stream with a portion of a rotating mass of sorbent material at a temperature that allows sorption of said solute by said sorbent material to form a solute-adsorbed portion of sorbent material, and a product stream comprising solvent which simultaneously exits said rotating mass and is collected, wherein said process stream is salt water, said solute comprises sodium ions, and said solvent is water, and said sorbent material is comprised of solid zeolite elements assembled into a core with channels spacing between said elements;

b) continuously rotating said mass of sorbent material;

c) raising the temperature of the solute-adsorbed and rotated portion of sorbent material by contacting said portion with an eluant stream which is separate from said process stream and has a temperature that allows release of said solute to form an eluted portion of sorbent material, and wherein said eluant stream is generally parallel to an axis of rotation of said sorbent material;

d) cooling the further rotated and eluted portion of sorbent material with a gas cooling stream, wherein said gas cooling stream produces evaporative cooling to form a regenerated portion of sorbent material, wherein said cooling stream is dry air and is generally parallel to an axis of rotation of said sorbent material;

e) simultaneously with steps a–d, collecting product stream comprising solvent; and f) continuously repeating steps a–e.

* * * * *